United States Patent [19]  [11] 3,932,329
Lakshmanan  [45] Jan. 13, 1976

[54] ADHESIVE COMPOSITION
[75] Inventor: Pallavoor R. Lakshmanan, Allison Park, Pa.
[73] Assignee: Gulf Research & Development Company, Pittsburgh, Pa.
[22] Filed: Aug. 1, 1974
[21] Appl. No.: 493,773

[52] U.S. Cl............................ 260/27 R; 260/28.5 A
[51] Int. Cl.²........................................... C08L 93/04
[58] Field of Search.......... 260/27 R, 880 B, 28.5 A

[56] References Cited
UNITED STATES PATENTS
3,198,760 8/1965 Widenor............................ 260/27 R
3,231,635 1/1966 Holden................................. 260/880
3,658,740 4/1972 Marrs.................................. 260/27 R OTHER PUBLICATIONS
"Railsback" Rubber Age, Jan. 1964, p. 584.

Primary Examiner—Lewis T. Jacobs

[57] ABSTRACT

An adhesive composition consisting essentially of a styrene-isoprene block copolymer, a zinc salt of rosin and a microcrystalline wax.

7 Claims, No Drawings

ADHESIVE COMPOSITION

This invention relates to an adhesive composition having a bond strength at room temperature (about 72° F.) and above of at least about one pound per inch, preferably at least about 1.5 pounds per inch, consisting essentially of a styrene-isoprene block copolymer, a zinc salt or rosin (zinc resinate) and a microcrystalline wax.

The styrene-isoprene block copolymer product present in the adhesive composition of the present invention has the following general configuration:

A — B — A wherein each terminal A is a styrene polymer block with a glass transition temperature above about room temperature (26° C.) and which is relatively incompatible with the elastomeric segment B, defined hereinafter, with the average molecular weight of each A being from about 2,000 to about 100,000, preferably from about 5,000 to about 50,000. The molecular weight of each segment A need not be the same. B is an isoprene polymer with a glass transition temperature below about room temperature (26° C.), with the average molecular weight of B being from about 25,000 to about 1,000,000, preferably from about 50,000 to about 500,000. The difference in glass transition temperature between an end block A, and a center block B, is preferably greater than about 100° C. In the block copolymer used herein the total of the terminal blocks A will amount to about eight to about 50 weight per cent, preferably about 10 to about 40 weight per cent, based on the total weight of the block copolymer.

The second component of the adhesive herein is a zinc salt of rosin (including a disproportionated rosin) having a zinc content of between about four and about nine weight per cent and a melting point (Ring and Ball softening points) of between about 80° to about 190° C. Rosin disproportionation involves, for example, heating the resin in excess of 200° C. to convert the oxidation-susceptible sites, e.g., conjugated double bond in the abietic acid structure, to less susceptible structures, such as dehydro-abietic acid, tetrahydro-abietic acid and dihydro-abietic acid.

The third component of the claimed adhesive is a microcrystalline wax. By "microcrystalline wax", I intend to include branched-chain hydrocarbons and alkylcycloaliphatic (naphthenic hydrocarbons) as well as straight-chain hydrocarbons whose molecular weight range is from about 400 to about 800, as defined, for example, in Encyclopedia of Polymer Science and Technology, Interscience Publishers-A division of John Wiley, New York, New York — 1971 — Volume 14, pages 770 and 771.

The adhesive composition herein will consist essentially of the following components:

| Component | Weight Per Cent Broad Range | Preferred Range |
|---|---|---|
| Styrene-Isoprene Block Copolymer | 15-40 | 20-35 |
| Zinc Salt of Rosin | 15-50 | 20-50 |
| Microcrystalline Wax | 70-10 | 60-15 |

If desired, an antioxidant, such as 1,3,5-trimethyl-2,4,6-(3,5-ditertiarybutyl-4-hydroxybenzyl)benzene or dilaurylthiopropionate, can also be incorporated in the adhesive composition in an amount of about 0.1 to about five, preferably about 0.2 to about two, weight per cent, based on the weight of the final composition.

The adhesive composition can be prepared in any conventional manner. Thus, for example, a preferred procedure involves the use of the so-called melt-mixing technique wherein the microcrystalline wax, together with antioxidant, if used, is maintained in a stirred, molten state at a temperature of about 100° to about 190° C., preferably about 130° to about 170° C., during which time the zinc salt of rosin is added thereto, followed by the styreneisoprene block copolymer. Mixing is continued until a homogeneous mixture is obtained.

The new adhesives of the present invention can be used as a hot melt adhesive to bond a plastic film, such as polyethylene, to itself or to paper, cardboard, aluminum foil, etc. In particular the new adhesives can be used to bond polyethylene to itself. A particularly preferred utility resides in bonding polyethylene to itself in the preparation of polyethylene grocery bags that are often used in place of Kraft paper grocery bags. In making such bags that would be competitive with those made of Kraft paper it is desirable that polyethylene bags have a bond strength at room temperature (about 72° F.) and above of at least about one pound per inch, preferably at least about 1.5 pounds per inch.

The improved adhesive compositions of the present invention can be understood by reference to the following. Compositions were prepared following the melt-mixing technique described, using a temperature of 160° to 170° C., containing (1) Kraton 1107; (2) Statac 100, Staybelite Ester 10 or Zirex; (3) Microwax 15, Multiwax 180M or Gulfwax 40; and (4) the antioxidants 1,3,5-trimethyl-2,4,6-(3,5-ditertiary-4-hydroxybenzyl)benzene and dilaurylthiodi-propionate.

Polyethylene laminate test specimens were prepared by applying each of the adhesives so prepared to a 2.0 mil (3 inch × 10 inch) high density polyethylene film by means of an electrically-operated glue gun that dispensed molten adhesive either by mechanical or manual means. The adhesive was applied at 149° to 154° C. to the film as a continuous bead ⅛ inch wide and then a film of similar dimension was placed on top of the film carrying the bead of adhesive. The laminates were permitted to rest for 48 hours prior to test specimen preparations. Three specimens, each 1 inch × 3 inches, were then cut from the film samples in a direction across the adhesive direction. The bond strength was measured by peeling at the glue line by means of a suitable test device, such as an Instron test device, at a peel rate of 2 inches per minute. The maximum strength in pounds necessary to cause rupture of the bond was noted. The average of three such determinations was recorded. The results obtained are tabulated below in Table I.

Table I

| Run Number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Components, Grams | | | | | | | | | | | | | | |
| Kraton 1107 | 20 | 20 | 20 | 20 | 20 | 20 | 20 | 20 | 20 | 20 | 20 | 24 | 20 | 24 |
| Sta-tac 100 | 20 | 30 | None | None | None | None | None | None | None | None | None | None | None | 30 |
| Staybelite Ester 10 | None | None | 20 | 26 | 30 | None | None | None | None | None | None | None | None | None |
| Zirex | None | None | None | None | None | 20 | 26 | 30 | 20 | 26 | 30 | 30 | 26 | None |
| Microwax 15 | 60 | 60 | 60 | 54 | 50 | 60 | 54 | 50 | None | None | None | None | None | None |
| Multiwax 180M | None | None | None | None | None | None | None | None | 60 | 54 | 50 | 46 | None | 46 |
| Gulfwax 40 | None | None | None | None | None | None | None | None | None | None | None | None | 54 | None |
| 1,3,5-trimethyl-2,4,6-(3,5-ditertiary-4-hydroxybenzyl)benzene | 0.5 | 0.5 | 0.5 | 0.5 | 0.5 | 0.5 | 0.5 | 0.5 | 0.5 | 0.5 | 0.5 | 0.5 | 0.5 | 0.5 |
| Dilaurylthiodipropionate | 0.5 | 0.5 | 0.5 | 0.5 | 0.5 | 0.5 | 0.5 | 0.5 | 0.5 | 0.5 | 0.5 | 0.5 | 0.5 | 0.5 |
| Results | | | | | | | | | | | | | | |
| Ring and Ball Softening Point, °F. | 194 | 198 | 196 | 196 | 192 | 192 | 200 | 196 | 207 | 207 | 208 | 212 | 188 | 200 |
| Viscosity, Cps at 300°F. | 1875 | 2000 | 475 | 590 | 700 | 1500 | 1750 | 1910 | 11,400 | 11,200 | 11,200 | >25,000 | 886 | 10,500 |
| Bond Strength, Pounds/Inch At 120°F. | 0.7 | 0.9 | 0.5 | 0.4 | 0.5 | 1.1 | 2.8 | 2.1 | 1.3 | 1.6 | 1.9 | 2.5 | 0.8 | 0.6 |
| 73°F. | 6.4* | 6.2* | 6.5 | 6.7 | 7.3 | 5.3* | 6.1* | 6.3* | 7.5 | 6.4 | 6.6 | 7.2 | 6.8 | 6.7* |

\* Film tore at indicated bond strength

Referring to the components used in the adhesive compositions above, Kraton 1107 is a styrene-isoprene block copolymer made and sold by Shell Chemicals wherein the terminal styrene block has a molecular weight of about 2,000 to about 100,000 and the center isoprene block has a molecular weight of about 25,000 to about 1,000,000, with the styrene block constituting about 15 per cent by weight of the total block: Sta-tac 100 is an isoprenepiperylene copolymer made and sold by Rheichold Chemicals, Inc., having a melting point of 105° C.; Staybelite Ester 10 is a glycerol ester of hydrogenated rosin made and sold by Hercules, Inc.; Zirex is a zinc resinate containing 8.75 weight per cent zinc having a melting point of 158° to 164° C. and is made and sold by Rheichold Chemicals, Inc.; Multiwax 180M is a microcrystalline wax having a melting point (ASTM D-127) of 180° to 190° F., a needle penetration (ASTM D-1321) at 77° F. of 15 to 20 and a Saybolt Viscosity (ASTM D-88) at 210° F. SUS of 75 to 90 and is made and sold by Sonneborn Division of Witco Chemicals Company; Microwax 15 is a microcrystalline wax having a melting point (ASTM D-127) of 187° F. and is made and sold by International Wax Refining Company; and Gulfwax 40 has a melting point (ASTM D-87) of 140.1° F., a needle penetration (ASTM D-1321) at 77° F. of 14 and a Saybolt Viscosity (ASTM D-127) at 210° F. SUS of 41.6 and is made and sold by Gulf Oil Corporation.

The data in Table I illustrates the uniqueness of the adhesive composition defined and claimed herein in providing a bond strength that is adequate at room temperature and above. The compositions of Examples 1 and 2, containing a styrene-isoprene block copolymer, an isoprene-piperylene copolymer and microcrystalline wax, and of Examples 3, 4 and 5, containing a styrene-isoprene block copolymer, a glycerol ester of a hydrogenated rosin and microcrystalline wax, showed unacceptable bonding strength at 73° F. However, in each of Examples 6, 7 and 8, the mere substitution of the zinc salt of rosin (zinc resinate) for either the isoprenepiperylene copolymer or the glycerol ester of a hydrogenated rosin resulted in adhesive compositions having superior bonding strengths. This is further illustrated in Examples 9, 10, 11 and 12 which are similar to Examples 6, 7 and 8 except that a different microcrystalline wax was used. Example 13 shows that even though a styreneisoprene block copolymer and a zinc salt of rosin are present in an adhesive composition the additional presence of a microcrystalline wax is critical. In this Example a paraffin wax was substituted for the microcrystalline wax but the composition failed to have an adequate bonding strength at 120° F. Similarly, the absence of a zinc salt of rosin is shown to be critical in Example 14. Even though the styrene-isoprene block copolymer and a microcrystalline wax are present, the zinc salt of rosin is replaced with an isoprenepiperylene copolymer. It will be noted that the bonding strength of the adhesive composition at 120° F. is unsatisfactory.

Obviously, many modifications and variations of the invention, as hereinabove set forth, can be made without departing from the spirit and scope thereof and, therefore, only such limitations should be imposed as are indicated in the appended claims.

I claim:

1. An adhesive composition consisting essentially of a styrene-isoprene block copolymer, a zinc salt of rosin and a microcrystalline wax wherein the components are present in the following ranges:

| Component | Weight Per Cent |
|---|---|
| Styrene-Isoprene Block Copolymer | 20–35 |
| Zinc Salt of Rosin | 20–50 |
| Microcrystalline Wax | 60–15. |

2. The composition of claim 1 wherein the components are present in the following ranges:

| Component | Weight Per Cent |
|---|---|
| Styrene-Isoprene Block Copolymer | 15–40 |
| Zinc Salt of Rosin | 15–50 |
| Microcrystalline Wax | 70–10. |

3. The composition of claim 1 wherein the styrene-isoprene block copolymer has the following general configuration:

A — B — A wherein A is a styrene polymer block having an average molecular weight of about 2,000 to about 100,000 and B is an isoprene polymer block having an average molecular weight of about 25,000 to about 1,000,000.

4. The composition of claim 3 wherein the styrene polymer block has an average molecular weight of about 5,000 to about 50,000 and the isoprene polymer block has an average molecular weight of about 50,000 to about 500,000.

5. The composition of claim 3 wherein the total of the terminal blocks A amount to about eight to about 50 weight per cent of the block copolymer.

6. The composition of claim 3 wherein the total of the terminal blocks A amount to about 10 to about 40 weight per cent of the block copolymer.

7. The composition of claim 1 wherein the zinc content of the zinc salt of rosin is from about four to about nine weight per cent.

* * * * *